United States Patent
Yasutomi et al.

(10) Patent No.: US 12,500,485 B2
(45) Date of Patent: Dec. 16, 2025

(54) STATOR AND ROTARY ELECTRIC MACHINE USING SAME

(71) Applicant: Mitsubishi Electric Corporation, Tokyo (JP)

(72) Inventors: Jumpei Yasutomi, Tokyo (JP); Hironori Tsuiki, Tokyo (JP); Kazuya Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 321 days.

(21) Appl. No.: 18/091,613

(22) Filed: Dec. 30, 2022

(65) Prior Publication Data
US 2023/0327523 A1    Oct. 12, 2023

(30) Foreign Application Priority Data
Apr. 11, 2022    (JP) .................................. 2022-064903

(51) Int. Cl.
  *H02K 11/25*    (2016.01)
  *H02K 1/16*    (2006.01)
  *H02K 3/28*    (2006.01)

(52) U.S. Cl.
  CPC .............. *H02K 11/25* (2016.01); *H02K 1/16* (2013.01); *H02K 3/28* (2013.01)

(58) Field of Classification Search
  CPC ....... H02K 3/50; H02K 11/25; H02K 2203/09
  USPC .................................................. 310/68 C, 71
  See application file for complete search history.

(56) References Cited

U.S. PATENT DOCUMENTS

2019/0267872 A1*    8/2019    Inoue ..................... H02K 11/25
2023/0016106 A1*    1/2023    Beatty ..................... H02K 3/50

FOREIGN PATENT DOCUMENTS

| JP | 2013-219913 A | 10/2013 |
| JP | 2019-110676 A | 7/2019 |
| JP | 2021-191173 A | 12/2021 |
| WO | WO-2021246180 A1 * | 12/2021 |

OTHER PUBLICATIONS

Machine translation of WO-2021246180-A1 (Year: 2021).*
Office Action dated Feb. 28, 2023 from the Japanese Patent Office in JP Application No. 2022-064903.

* cited by examiner

*Primary Examiner* — Oluseye Iwarere
*Assistant Examiner* — Minki Chang
(74) *Attorney, Agent, or Firm* — Sughrue Mion, PLLC

(57) ABSTRACT

Provided is a stator in which size increase in the radial direction is suppressed and accuracy of temperature detection is improved. The stator includes: a cylindrical stator core; a plurality of coil conductors each having a coil body located in a slot of the stator core and a conductor end protruding from the stator core; a plurality of connection wires extending in a circumferential direction of the stator core and connecting the conductor ends separated from each other in the circumferential direction; and a temperature sensor, wherein at least two of the connection wires have parts arranged with an interval therebetween in an axial direction of the stator core, and the temperature sensor is located in the interval and held between the connection wires on both sides in the axial direction.

3 Claims, 11 Drawing Sheets

STATOR AND ROTARY ELECTRIC MACHINE USING SAME

BACKGROUND

The present disclosure relates to a stator and a rotary electric machine using the same.

A rotary electric machine includes a rotor and a stator having a stator core and a stator coil. The rotary electric machine operates as an electric motor which drives an internal combustion engine, and the rotary electric machine functions as an electric generator which generates power by being driven by the internal combustion engine. In a case where the rotary electric machine operates as an electric motor, current flows through the stator coil. Then, by Joule heat due to the current flowing through the stator coil, the temperature of the stator coil increases. At this time, if the temperature of the stator coil increases excessively, the stator coil and a component provided around the stator coil might be damaged by heat. Therefore, a temperature sensor for detecting the temperature of the stator coil is provided to the stator coil, and applied current to the stator coil is controlled on the basis of the temperature detected by the temperature sensor, thereby preventing occurrence of damage to a component due to excessive increase in the temperature of the stator coil.

A structure of a temperature sensor provided to the stator coil is disclosed (see, for example, Patent Document 1). In the disclosed structure, a neutral point sheet metal busbar for making Y connection of three-phase stator coils has, at an end thereof, a bent portion bent back in a U shape in the radial direction, and the temperature sensor is retained by being held within the bent portion part. With this structure, heat of the stator coil is transferred from both sides of the temperature sensor, whereby accuracy of temperature detection for the stator coil can be improved.

Patent Document 1: Japanese Laid-Open Patent Publication No. 2019-110676

In Patent Document 1, since the temperature sensor is retained by being held within the bent portion formed by bending the end of the neutral point busbar made of sheet metal in the radial direction, accuracy of temperature detection for the stator coil is improved. However, since the end of the neutral point busbar is bent outward in the radial direction, there is a problem that the size of the stator increases in the radial direction only at the part where the temperature sensor is attached.

SUMMARY

Accordingly, an object of the present disclosure is to provide a stator in which size increase in the radial direction is suppressed and accuracy of temperature detection is improved, and a rotary electric machine whose size is reduced by suppressing size increase in the radial direction of a stator.

A stator according to the present disclosure includes: a cylindrical stator core; a plurality of coil conductors each having a coil body located in a slot of the stator core and a conductor end protruding from the stator core; a plurality of connection wires extending in a circumferential direction of the stator core and connecting the conductor ends separated from each other in the circumferential direction; and a temperature sensor, wherein at least two of the connection wires have parts arranged with an interval therebetween in an axial direction of the stator core, and the temperature sensor is located in the interval and held between the connection wires on both sides in the axial direction.

A rotary electric machine according to the present disclosure includes: a rotor which has a rotor core and rotates integrally with a rotary shaft; and the stator according to the present disclosure, located on an outer side in a radial direction of the rotor core.

The stator according to the present disclosure includes: the cylindrical stator core; the plurality of coil conductors each having the coil body located in the slot of the stator core and the conductor end protruding from the stator core; the plurality of connection wires extending in the circumferential direction of the stator core and connecting the conductor ends separated from each other in the circumferential direction; and the temperature sensor, wherein at least two of the connection wires have the parts arranged with the interval therebetween in the axial direction of the stator core, and the temperature sensor is located in the interval and held between the connection wires on both sides in the axial direction. Therefore, the part where the temperature sensor is located does not protrude in the radial direction of the stator, and thus size increase in the radial direction of the stator can be suppressed. In addition, since the temperature sensor is held between at least two of the connection wires, heat of the coil conductors and the connection wires forming the stator coil is transferred from both sides of the temperature sensor, and thus accuracy of temperature detection for the stator coil can be improved.

The rotary electric machine according to the present disclosure includes: the rotor which has the rotor core and rotates integrally with the rotary shaft; and the stator according to the present disclosure, located on the outer side in the radial direction of the rotor core. Therefore, size increase in the radial direction of the stator is suppressed, whereby the rotary electric machine having a reduced size can be obtained.

DETAILED DESCRIPTION OF THE EMBODIMENTS

Figure 1:
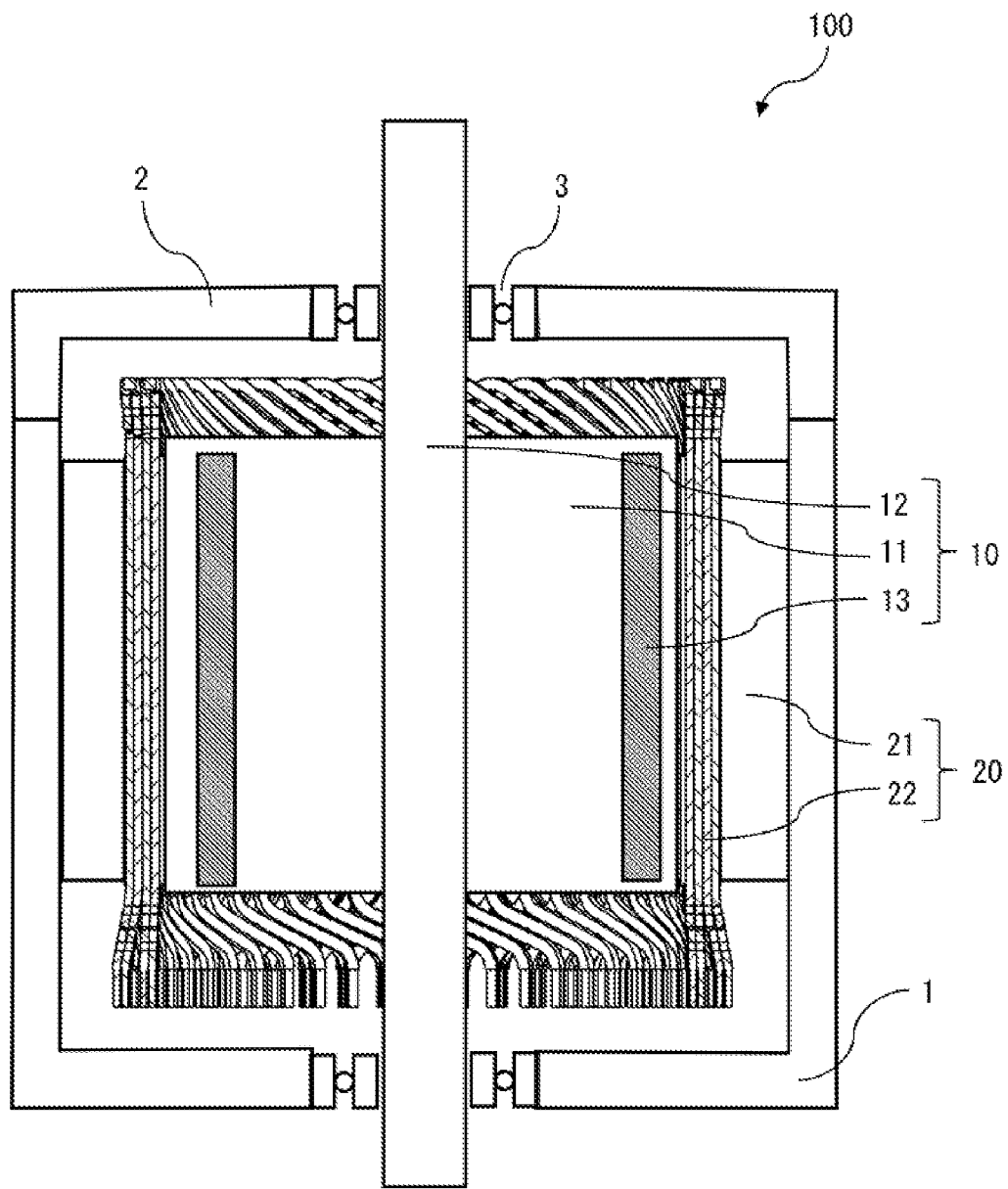
FIG. 1 is a sectional view along a direction parallel to the axial direction, schematically showing a rotary electric machine according to the first embodiment of the present disclosure.

Hereinafter, a stator and a rotary electric machine using the same according to embodiments of the present disclosure will be described with reference to the drawings. In the drawings, the same or corresponding members and parts are denoted by the same reference characters, to give description.

First Embodiment

Figure 2:
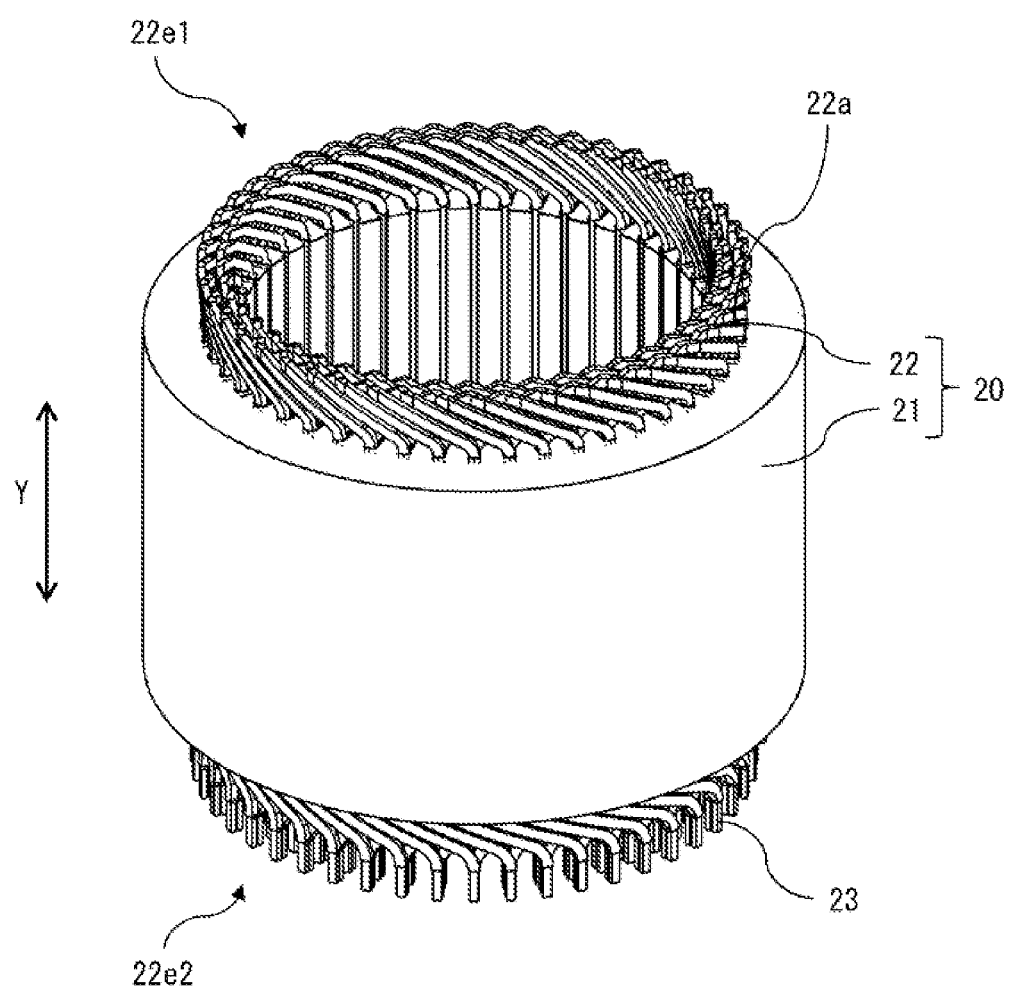
FIG. 2 is a perspective view schematically showing a stator of the rotary electric machine according to the first embodiment.
Figure 3:
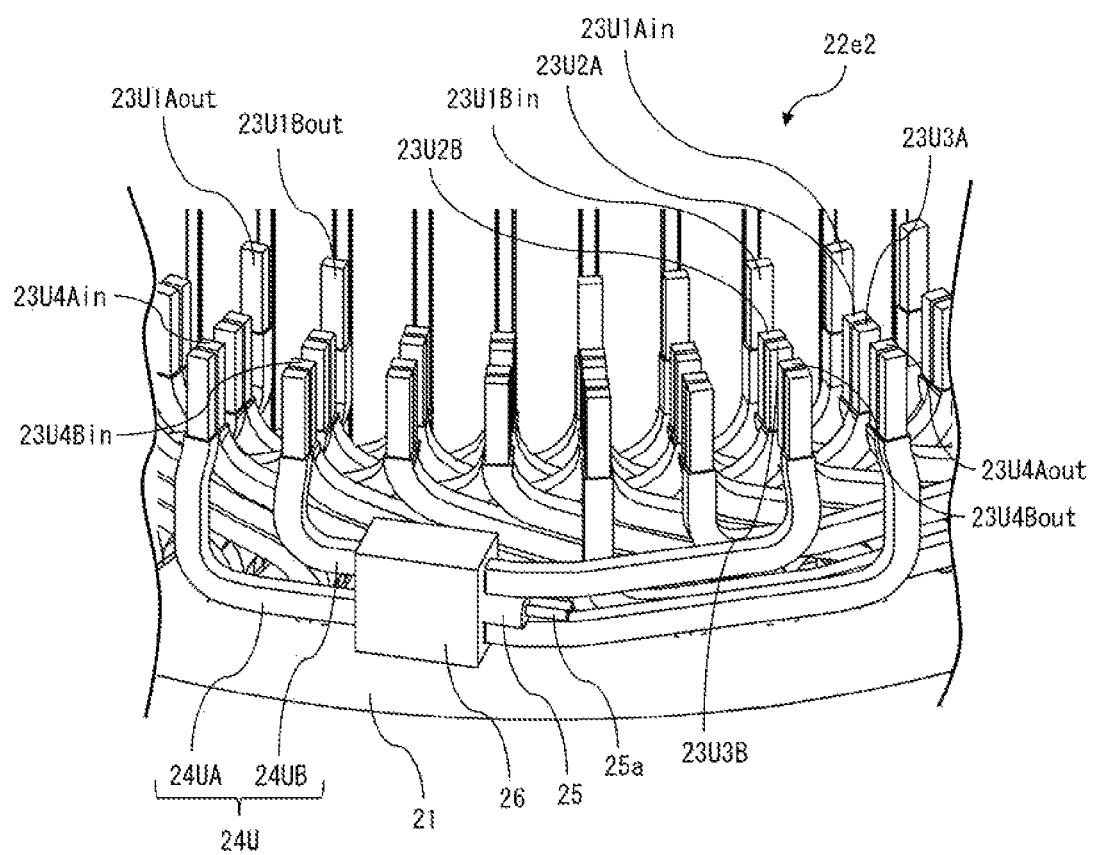
FIG. 3 is a perspective view showing a major part of the stator of the rotary electric machine according to the first embodiment.
Figure 4:
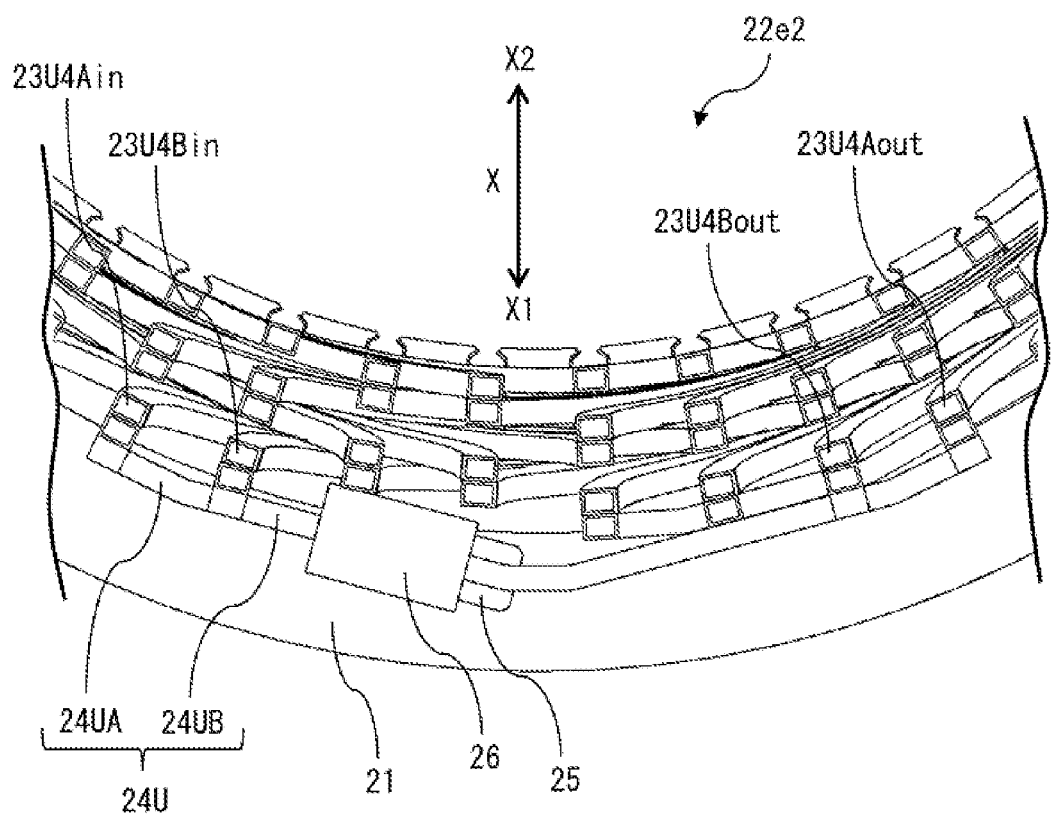
FIG. 4 is a plan view showing the major part of the stator of the rotary electric machine according to the first embodiment.
Figure 5:
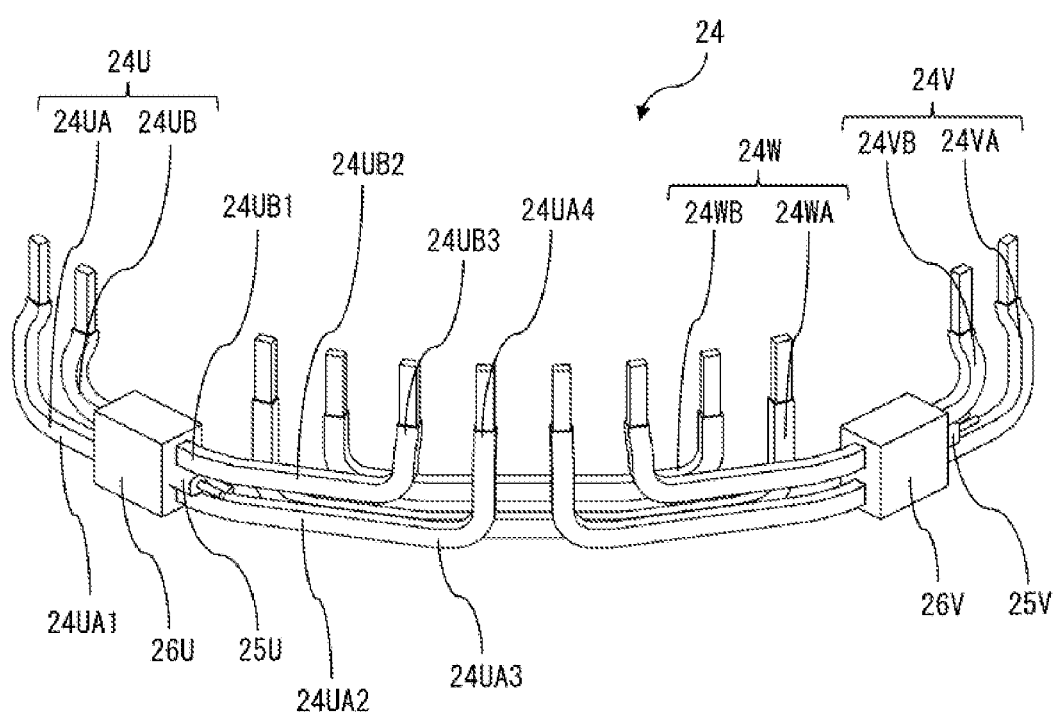
FIG. 5 is a perspective view of a connection wire unit of the rotary electric machine according to the first embodiment.
Figure 6:
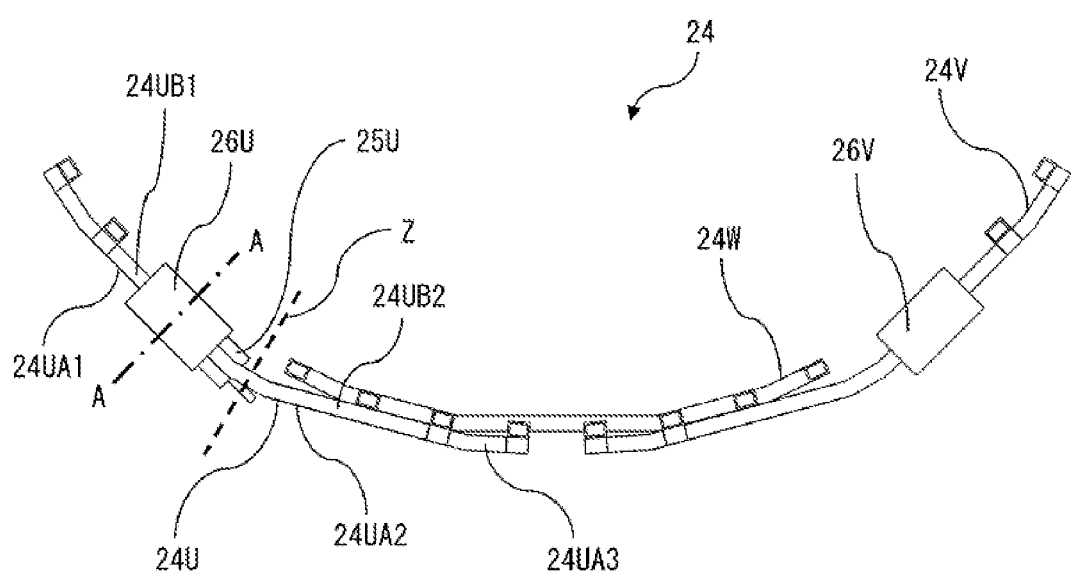
FIG. 6 is a plan view of the connection wire unit of the rotary electric machine according to the first embodiment.
Figure 7:
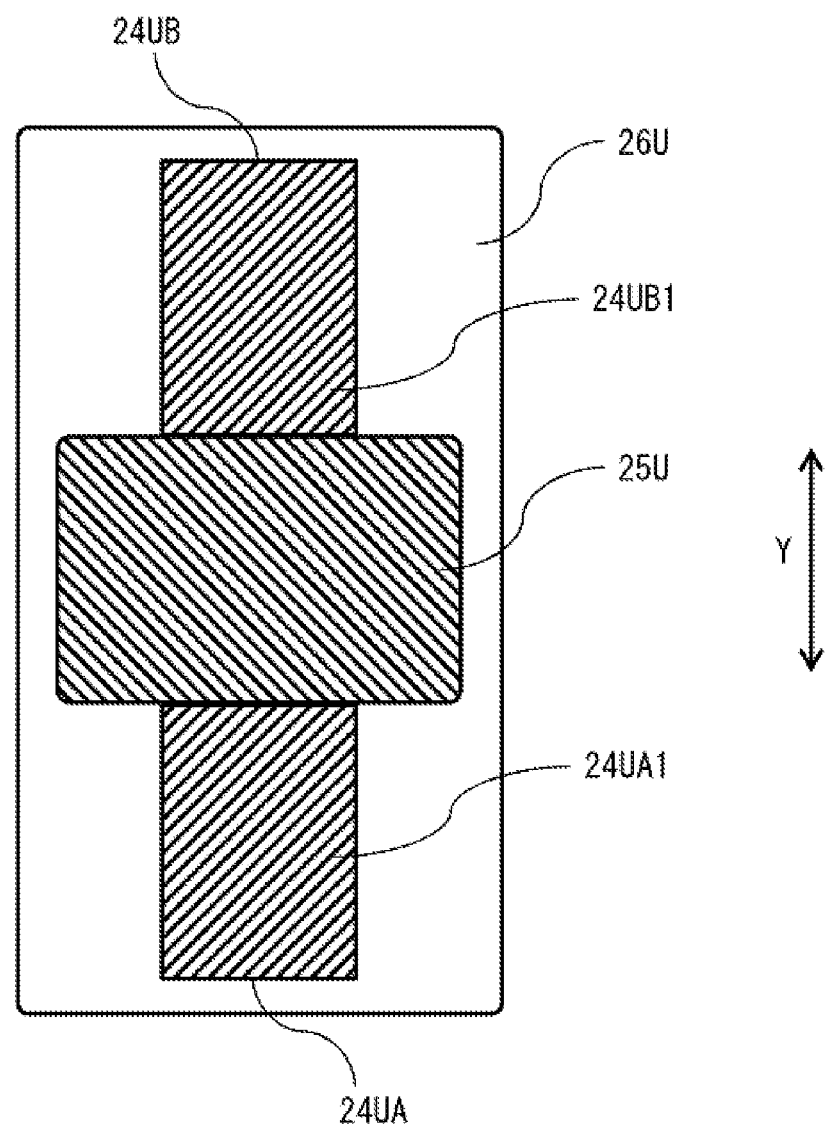
FIG. 7 is a sectional view of the connection wire unit taken at an A-A cross-section position in FIG. 6.

FIG. 1 is a sectional view along a direction parallel to the axial direction, schematically showing a rotary electric machine 100 according to the first embodiment. FIG. 2 is a perspective view schematically showing a stator 20 of the rotary electric machine 100. FIG. 3 is a perspective view showing a major part of the stator 20 of the rotary electric machine 100. FIG. 4 is a plan view showing the major part of the stator 20 of the rotary electric machine 100. FIG. 5 is a perspective view of a connection wire unit 24 of the rotary electric machine 100. FIG. 6 is a plan view of the connection wire unit 24 of the rotary electric machine 100. FIG. 7 is a sectional view of the connection wire unit 24 taken at an A-A cross-section position in FIG. 6, and shows a cross-section of connection wires 24U for U phase, a temperature sensor 25U for U phase, and a resin member 26U for U phase. The rotary electric machine 100 includes the stator 20 and a rotor 10, and operates as an electric motor which drives an internal combustion engine (not shown). Alternatively, the rotary electric machine 100 functions as an electric generator which generates power by being driven by the internal combustion engine. Hereinafter, the circumferential direction of a stator core 21 is referred to as a circumferential direction, the axial direction of the stator core 21 is referred to as an axial direction, and the radial direction of the stator core 21 is referred to as a radial direction. In the drawings, the axial direction is indicated by an arrow Y and the radial direction is indicated by an arrow X, and a direction toward an outer side in the radial direction is defined as X1 and a direction toward an inner side in the radial direction is defined as X2.

<Rotary Electric Machine 100>

The rotary electric machine 100 includes the rotor which has a rotor core 11 and rotates integrally with a rotary shaft 12, and the stator 20 located on the outer side in the radial direction of the rotor core 11. The rotary electric machine 100 further includes a housing 1 having a bottomed cylindrical shape, and a bracket 2 which closes an opening of the housing 1. The stator 20 is fixed to the housing 1 by fixation means such as shrink fit or press fit. The rotor 10 has an outer circumferential surface opposed to the inner circumferential surface of the stator 20, and is rotatably supported by a bottom portion of the housing 1 and the bracket 2 via bearings 3.

The rotor 10 includes the rotor core 11, the rotary shaft 12 inserted at the axis position of the rotor core 11, and permanent magnets 13 forming magnetic poles. The permanent magnets 13 are embedded on the outer circumferential surface side of the rotor core 11 and are arranged at a predetermined pitch in the circumferential direction. In the present embodiment, the rotor 10 is a permanent magnet rotor. The rotor 10 is not limited to a permanent magnet rotor, and may have a configuration in which a field winding is wound around the rotor core 11.

<Stator 20>

As shown in FIG. 2, the stator 20 includes the cylindrical stator core 21 and a stator coil 22 mounted to the stator core 21. The stator core 21 has an annular yoke, a plurality of teeth protruding radially inward from the inner circumferential surface of the yoke and arranged at intervals in the circumferential direction, and slots formed between the teeth.

The stator coil 22 is formed from a plurality of coil conductors 22a and a plurality of connection wires. Each coil conductor 22a has a coil body located in the slot of the stator core 21 and a conductor end protruding from the stator core 21. Each connection wire extends in the circumferential direction and connects the conductor ends separated from each other in the circumferential direction.

The coil conductor 22a is made of an insulation-coated conductor and is formed in a U shape. The coil conductor 22a is inserted into the slots at positions 6-slot away from each other in the circumferential direction such that the bottom of the U shape is located on one side in the axial direction of the stator core 21. In the present embodiment, a non-wire-connection side coil end portion 22e1 side shown on the upper side in FIG. 2 is the one side in the axial direction of the stator core 21. By inserting the coil conductors 22a into the slots, the non-wire-connection side coil end portion 22e1 is formed with such a structure that the slots located 6-slot away from each other are connected by the coil conductors 22a consecutively in the circumferential direction at an end surface on the one side in the axial direction of the stator core 21. A wire-connection side coil end portion 22e2 is formed with such a structure that terminal peeled portions 23 which are conductor ends with insulation coats removed protrude from an end surface on the other side in the axial direction of the stator core 21.

The terminal peeled portions 23 at which conductors are exposed are appropriately welded, whereby the plurality of coil conductors 22a are electrically connected to each other. In the present embodiment, the slots are configured such that three phases are sequentially arranged while slots for the same phase are two by two adjacent to each other like U phase, U phase, V phase, V phase, W phase, W phase in the circumferential direction. The slots for the same phase at positions 6-slot away from each other in the circumferential direction are connected at the non-wire-connection side coil end portion 22e1 and the wire-connection side coil end portion 22e2.

The details of the structure of the wire-connection side coil end portion 22e2 and a current conduction route for U phase will be described with reference to FIG. 3. FIG. 3 is an enlarged view of a part of the wire-connection side coil end portion 22e2 of the stator coil 22. The connection wires 24U for U phase are composed of two connection wires 24UA, 24UB. First, currents are supplied from a power supply to two parts that are terminal peeled portions 23U1Ain, 23U1Bin for U phase located on the inner side in the radial direction. The respective supplied currents flow through both coil end portions clockwise at 6-slot intervals to reach terminal peeled portions 23U2A, 23U2B for U phase. The terminal peeled portions 23U2A, 23U2B for U phase and terminal peeled portions 23U3A, 23U3B for U phase are electrically connected to each other by welding or the like.

The respective currents flow from the terminal peeled portions 23U3A, 23U3B for U phase clockwise at 6-slot intervals to reach terminal peeled portions 23U4Aout, 23U4Bout for U phase. The terminal peeled portion 23U4Aout for U phase and a terminal peeled portion 23U4Ain for U phase located 7-slot ahead are connected to each other by the connection wire 24UA for U phase. The terminal peeled portion 23U4Bout for U phase and a terminal peeled portion 23U4Bin for U phase located 5-slot ahead are connected to each other by the connection wire 24UB for U phase. If the terminal peeled portion 23U4Aout for U phase is connected to a terminal peeled portion 23U4Bin located 6-slot ahead and the terminal peeled portion 23U4Bout is connected to a terminal peeled portion 23U4Ain located 6-slot ahead, a potential difference arises in U phase so that circulation current is generated to cause loss. Therefore, here, they are respectively connected to the portions located 5-slot ahead and 7-slot ahead.

The currents flow from the terminal peeled portion 23U4Ain and the terminal peeled portion 23U4Bin, counterclockwise at this time, at 6-slot intervals, to finally reach a terminal peeled portion 23U1Aout and a terminal peeled portion 23U1Bout. The terminal peeled portions 23U1Aout, 23U1Bout are connected to a neutral point. Structures for V phase and W phase are also the same structure for U phase. With currents flowing in U phase, V phase, and W phase as described above, a magnetic field is generated at the rotor 10.

Regarding the non-wire-connection side coil end portions 22e1 respectively corresponding to U phase, V phase, and W phase, three phases are sequentially arranged clockwise while parts for the same phase are two by two adjacent to each other like U phase, U phase, V phase, V phase, W phase, W phase. Further, over the entire circumference of the stator 20, similarly, the respective non-wire-connection side coil end portions 22e1 for three phases are arranged counterclockwise while parts for the same phase are two by two adjacent to each other.

<Temperature Sensor 25>

The arrangement structure of a temperature sensor which is a major part of the present disclosure will be described. The stator 20 includes a temperature sensor 25 for detecting the temperature of the stator coil 22. At least two of the connection wires have parts arranged with an interval therebetween in the axial direction of the stator core 21, and the temperature sensor 25 is located in the interval and held between the connection wires on both sides in the axial direction. In the present embodiment, as shown in FIG. 3, at the wire-connection side coil end portion 22e2, the connection wires 24UA, 24UB are at least two of the connection wires. The two connection wires 24UA, 24UB have parts arranged with an interval therebetween in the axial direction of the stator core 21, and the temperature sensor is located in the interval and retained by being held between the connection wires 24UA, 24UB on both sides in the axial direction. With this structure, a part where the temperature sensor 25 is located does not protrude in the radial direction of the stator 20, and thus size increase in the radial direction of the stator 20 can be suppressed. In addition, since the temperature sensor 25 is held between the connection wires 24UA, 24UB, heat of the stator coil 22 is transferred from both sides of the temperature sensor 25, and thus accuracy of temperature detection for the stator coil 22 can be improved. In the present embodiment, one connection wire is located on each of both sides in the axial direction of the temperature sensor 25. However, without limitation thereto, a plurality of connection wires may be located on each of both sides in the axial direction of the temperature sensor 25.

The connection wires 24UA, 24UB which are at least two of the connection wires have straight portions extending in a constant direction between the connected terminal peeled portions. The straight portions are the parts arranged with the interval therebetween in the axial direction, and the straight portions hold the temperature sensor 25 therebetween. With this structure, since the temperature sensor 25 is located at parts of the straight portions, the areas of the connection wires 24UA, 24UB overlapping the temperature sensor 25 as seen in the axial direction increase, so that accuracy of temperature detection for the stator coil 22 can be further improved. In addition, the straight portions of the connection wires 24UA, 24UB are located in parallel to each other. With this structure, since the areas of the connection wires 24UA, 24UB contacting with the temperature sensor 25 increase, the temperature sensor 25 is retained more stably by the connection wires 24UA, 24UB, and accuracy of temperature detection for the stator coil 22 can be further improved.

The connection wires 24UA, 24UB and the coil conductors 22a are formed by insulation-coated conductors made of the same material. With this structure, it becomes unnecessary to provide a member for ensuring insulation around the part where the connection wires 24UA, 24UB and the coil conductors 22a are located, and thus the size of the stator 20 can be reduced. In addition, since the connection wires 24UA, 24UB and the coil conductors 22a are made of the same material, thermal resistance that can arise at the connection part therebetween is reduced, whereby heat generation due to currents flowing through the connection wires 24UA, 24UB and the coil conductors 22a can be suppressed.

The temperature sensor 25 has a temperature detection element (not shown) and transmits temperature information to outside via a lead wire 25a connected to the temperature detection element. The temperature sensor 25 and the parts of the straight portions holding the temperature sensor 25 therebetween are surrounded by a resin member 26. The temperature sensor 25 and the connection wires 24UA, 24UB are surrounded by the resin member 26 by, for example, insert molding, excluding the lead wire 25a of the temperature sensor 25, whereby the temperature sensor 25 is fixed to the connection wires 24UA, 24UB. With this structure, only the parts of the straight portions holding the temperature sensor therebetween are surrounded by the resin member 26. Therefore, the usage amount of the resin member 26 is decreased, whereby the thermal capacity around the temperature sensor 25 is reduced and heat dissipation to the resin member 26 is minimized, so that heat from the connection wires 24UA, 24UB can be transferred to the temperature sensor 25. Thus, accuracy of temperature detection for the stator coil 22 can be further improved.

The temperature detection element is, for example, a thermistor whose resistance value changes with temperature change. The lead wire 25a of the temperature sensor 25 is connected to a control unit (not shown) for controlling power supplied to the rotary electric machine 100, for example. The control unit controls applied current to the stator coil 22 on the basis of the temperature detected by the temperature sensor 25, thereby suppressing occurrence of damage to the stator coil 22 or a component provided around the stator coil 22 due to excessive temperature increase in the stator coil 22. In FIG. 3, the lead wire 25a extends rightward, but is not limited thereto. In accordance with arrangement of a device connected to the lead wire 25a, the lead wire 25a may extend leftward from the left side of the temperature sensor 25.

A plurality of terminal peeled portions protrude from the stator core 21 at respective positions in the circumferential direction and respective positions in the radial direction, and a plurality of connection wires 24U, 24V, 24W are located so as to be arranged in the circumferential direction and the radial direction as shown in FIG. 5. As shown in FIG. 4, the connection wires 24UA, 24UB which are at least two of the connection wires are located on the outer side in the radial direction of the terminal peeled portion 23U4Aout, the terminal peeled portion 23U4Bout, the terminal peeled portion 23U4Ain, and the terminal peeled portion 23U4Bin. The connection wires 24UA, 24UB are connected to these terminal peeled portions located on the outermost side in the radial direction. In the present embodiment, at parts on the outer side in the radial direction of these terminal peeled portions, the connection wires 24UA, 24UB are connected to these terminal peeled portions. With this structure, the height in the axial direction of the wire-connection side coil end portion 22e2 can be reduced.

The connection wires 24UA, 24UB are located on the outer side in the radial direction among the plurality of connection wires and are located on the inner side in the radial direction from the outer circumference of the stator core 21 as seen in the axial direction. With this structure, the part where the temperature sensor 25 is located does not protrude toward the outer side in the radial direction from the outer circumference of the stator 20, and thus size increase in the radial direction of the stator 20 can be suppressed. On the outer diameter side of the stator core 21, normally, a frame and the like are provided. Therefore, the size in the radial direction at the wire-connection side coil end portion 22e2 part needs to be reduced. In addition, since the lead wire 25a can be easily led out from the stator 20, the lead wire 25a and an external device can be easily connected to each other.

The connection wires 24UA, 24UB which are at least two of the connection wires are formed from rectangular wires as shown in FIG. 7. With this structure, the temperature sensor 25 can contact with surface parts of the connection wires 24UA, 24UB, whereby the areas of the connection wires 24UA, 24UB contacting with the temperature sensor 25 increase. Thus, the temperature sensor 25 can be retained more stably by the connection wires 24UA, 24UB and accuracy of temperature detection for the stator coil 22 can be further improved. In the present embodiment, the temperature sensor 25 has contact surfaces at parts to contact with the connection wire 24UA and the connection wire 24UB. Thus, the temperature sensor 25 is located such that the surface parts of the connection wires 24UA, 24UB and the contact surfaces of the temperature sensor 25 contact with each other, whereby thermal resistance between the connection wires 24UA, 24UB and the temperature sensor 25 is reduced and heat is readily transferred. The connection wires 24UA, 24UB and the coil conductor 22a are not limited to rectangular wires. However, in a case where the connection wires 24UA, 24UB are formed from rectangular wires, thermal resistance between the connection wires 24UA, 24UB and the temperature sensor 25 is reduced, whereby accuracy of temperature detection for the stator coil 22 can be further improved.

In the present embodiment, surfaces in the long-side direction in a cross-section of the parts of the rectangular wires holding the temperature sensor 25 therebetween are located in parallel to the axial direction, and the temperature sensor 25 is retained by surfaces in the short-side direction in the cross-section of the rectangular wires. With this structure, the size in the radial direction of the part where the temperature sensor 25 is located can be reduced, whereby the size of the stator 20 can be reduced.

Each of the plurality of coil conductors 22a forms a coil for any phase among coils for a plurality of phases, and at least two of the connection wires form a coil for the same phase. In the present embodiment, the connection wires 24UA, 24UB which are at least two of the connection wires form a coil for U phase. With this structure, the temperature of the stator coil for U phase can be measured independently. In addition, the stator 20 may include a plurality of the temperature sensors, and the plurality of temperature sensors may respectively detect the temperatures of coils for different phases. For example, the temperature sensors may be provided also to coils for V phase and W phase. With this structure, even if unbalanced currents occur in the stator coil 22 due to disconnection or the like and heat is abnormally generated only in one phase, the abnormality occurring only in one phase can be detected. Such an effect cannot be obtained if the temperature sensor is attached to the neutral point.

<Connection Wire Unit 24>

The details of the connection wire unit 24 composed of the connection wires of the respective coils for U phase, V phase, and W phase, will be described with reference to FIG. 5. In the present embodiment, the temperature sensor is not attached to the connection wires 24W for W phase, and the temperature sensors 25 are attached to the connection wires 24U for U phase and the connection wires 24V for V phase. Without limitation to the configuration in which the temperature sensors 25 are attached to the connection wires 24U for U phase and the connection wires 24V for V phase, the temperature sensor 25 may be attached also to the connection wires 24W for W phase.

The connection wire unit 24 includes the connection wires 24UA, 24UB which are the connection wires 24U for U phase, connection wires 24VA, 24VB which are the connection wires 24V for V phase, and connection wires 24WA, 24WB which are the connection wires 24W for W phase. The connection wires 24UA, 24VA, 24WA are connection wires connecting terminal peeled portions located 7-slot ahead. The connection wires 24UB, 24VB, 24WB are connection wires connecting the terminal peeled portions located 5-slot ahead. The temperature sensor 25U for detecting the temperature for U phase is retained by being held between the connection wires 24UA, 24UB on both sides in the axial direction. The temperature sensor 25V for detecting the temperature for V phase is retained by being held between the connection wires 24VA, 24VB on both sides in the axial direction. The temperature sensor 25U is fixed to the connection wires 24UA, 24UB by the resin member 26U, and the temperature sensor 25V is fixed to the connection wires 24VA, 24VB by a resin member 26V.

The connection wire 24UA for U phase connecting the terminal peeled portion located 7-slot ahead has straight portions 24UA1, 24UA2, 24UA3 and offset portions 24UA4, which are connected via bent portions. The straight portions 24UA1, 24UA2, 24UA3 form a part of the connection wire 24UA extending in the circumferential direction, and the offset portions 24UA4 are provided at both ends of the part extending in the circumferential direction. Ends of the offset portions 24UA4 are parts connected to the terminal peeled portions.

As shown in FIG. 6, the connection wire 24UB for U phase connecting the terminal peeled portion located 5-slot ahead is formed symmetrically with respect to a symmetry plane Z (indicated by a broken line in FIG. 6) which is a plane perpendicular to the circumferential direction, and has straight portions 24UB1, 24UB2 and offset portions 24UB3, which are connected via bent portions. The straight portions 24UB1, 24UB2 form a part of the connection wire 24UB extending in the circumferential direction, and the offset portions 24UB3 are provided at both ends of the part extending in the circumferential direction. Ends of the offset portions 24UB3 are parts connected to the terminal peeled portions.

As shown in FIG. 5, the offset portions 24UA4, 24UB3 are bent toward the inner side in the radial direction so as to offset one connection wire which is the coated conductor. Thus, the offset portions 24UA4, 24UB3 can be connected to the terminal peeled portions 23U4Aout, 23U4Bout (not shown in FIG. 5) provided on the inner side in the radial direction while avoiding contact with the connection wires 24WA, 24WB.

As shown in FIG. 6, the straight portion 24UA1 and the straight portion 24UB1, and the straight portion 24UA2 and the straight portion 24UB2, respectively have the same shape at parts overlapping each other in the axial direction. The respective parts having the same shape and overlapping each other in the axial direction are formed symmetrically with respect to the symmetry plane Z. The straight portion 24UA1 and the straight portion 24UB1, and the straight portion 24UA2 and the straight portion 24UB2, are respectively located in parallel with an interval therebetween in the axial direction. At the parts overlapping each other in the axial direction, the temperature sensor 25U is retained. In the present embodiment, the temperature sensor 25U is retained between the straight portion 24UA1 and the straight portion 24UB1. However, the part where the temperature sensor 25U is retained may be between the straight portion 24UA2 and the straight portion 24UB2.

As described above, the temperature sensor 25U is held in a part between the straight portions 24UA1, 24UB1 overlapping each other in the axial direction and having the same shape in the two connection wires 24UA, 24UB, and thus the connection wires 24UA, 24UB and the temperature sensor 25U are arranged in the axial direction, whereby the size in the radial direction of the stator 20 can be reduced. In addition, since the shapes of the connection wires 24UA, 24UB partially become the same common shape, working equipment can be shared therebetween, whereby productivity of the stator 20 is improved and the cost for the stator 20 can be reduced. In addition, since the shapes of the connection wires 24UA, 24UB are such shapes that connect straight portions instead of arc shapes, work equipment for the connection wires 24UA, 24UB can be simplified, whereby the cost for the stator 20 can be reduced.

In addition, in the present embodiment, at the wire-connection side coil end portion 22e2 where the coils for three phases are connected, the stator coil structure in which the terminal peeled portions for the same phase are sequentially arranged two by two, is adopted. Therefore, for making connection between the terminal peeled portions for the same phase, the connection wires 24UA, 24VA, 24WA connecting the terminal peeled portions located 7-slot ahead and the connection wires 24UB, 24VB, 24WB connecting the terminal peeled portions located 5-slot ahead can be efficiently located in parallel to the axial direction within a comparatively narrow area. As a result, by holding the temperature sensor 25 in the axial direction between the connection wires 24UA, 24UB, between the connection wires 24VA, 24VB, or between the connection wires 24WA, 24WB which are located in parallel to the axial direction as described above, the effect of reducing the size in the radial direction of the stator 20 is significantly exhibited, including arrangement of the connection wires holding the temperature sensor 25 therebetween. In addition, in a case where the arrangement structure of the temperature sensor 25 described above is applied to the rotary electric machine 100 shown in FIG. 1, size increase in the radial direction of the stator 20 is suppressed, whereby the rotary electric machine 100 having a reduced size can be obtained.

As described above, the stator 20 according to the first embodiment includes: the cylindrical stator core 21; the plurality of coil conductors 22a each having the coil body located in the slot of the stator core 21 and the terminal peeled portion protruding from the stator core 21; the plurality of connection wires extending in the circumferential direction of the stator core 21 and connecting the terminal peeled portions separated from each other in the circumferential direction; and the temperature sensor 25. The two connection wires 24UA, 24UB have parts arranged with an interval therebetween in the axial direction of the stator core 21, and the temperature sensor 25 is located in the interval and held between the connection wires 24UA, 24UB on both sides in the axial direction. Therefore, the part where the temperature sensor 25 is located does not protrude toward the outer side in the radial direction of the stator 20, and thus size increase in the radial direction of the stator 20 can be suppressed. In addition, since the temperature sensor 25 is held between the connection wires 24UA, 24UB, heat of the coil conductors 22a and the connection wires 24UA, 24UB forming the stator coil 22 is transferred from both sides of the temperature sensor 25, and thus accuracy of temperature detection for the stator coil 22 can be improved.

The plurality of terminal peeled portions may protrude from the stator core 21 at the respective positions in the circumferential direction and the respective positions in the radial direction, the plurality of connection wires may be located so as to be arranged in the circumferential direction and the radial direction, the two connection wires 24UA, 24UB may be connected to the terminal peeled portions located on the outermost side in the radial direction, and the two connection wires 24UA, 24UB may be located on the outer side in the radial direction among the plurality of connection wires and be located on the inner side in the radial direction from the outer circumference of the stator core 21 as seen in the axial direction. In this case, the height in the axial direction of the wire-connection side coil end portion 22e2 can be reduced. In addition, the part where the temperature sensor 25 is located does not protrude toward the outer side in the radial direction from the outer circumference of the stator 20, and thus size increase in the radial direction of the stator 20 can be suppressed. In addition, since the lead wire 25a of the temperature sensor can be easily led out from the stator 20, the lead wire 25a and an external device can be easily connected to each other.

The two connection wires 24UA, 24UB may have the straight portions extending in a constant direction between the connected terminal peeled portions, and the straight portions may be the parts arranged with the interval therebetween in the axial direction. In this case, since the temperature sensor 25 is located at the parts of the straight portions, the areas of the connection wires 24UA, 24UB overlapping the temperature sensor 25 as seen in the axial direction can be increased. Since the areas of the connection wires 24UA, 24UB overlapping the temperature sensor 25 increase, accuracy of temperature detection for the stator coil 22 can be further improved. In addition, the straight portions of the connection wires 24UA, 24UB may be located in parallel to each other. In this case, since the areas of the connection wires 24UA, 24UB contacting with the temperature sensor 25 increase, the temperature sensor 25 is retained more stably by the connection wires 24UA, 24UB, and accuracy of temperature detection for the stator coil 22 can be further improved.

The temperature sensor 25 and the parts of the straight portions holding the temperature sensor 25 therebetween may be surrounded by the resin member 26. In this case, only the parts of the straight portions holding the temperature sensor 25 therebetween are surrounded by the resin member 26. Therefore, the usage amount of the resin member 26 is decreased, whereby the thermal capacity around the temperature sensor 25 is reduced and heat dissipation to the resin member 26 is minimized, so that heat from the connection wires 24UA, 24UB can be transferred to the temperature sensor 25. Thus, accuracy of temperature detection for the stator coil 22 can be further improved. In addition, the connection wires and the coil conductors 22a may be formed by insulation-coated conductors made of the same material. In this case, it becomes unnecessary to provide a member for ensuring insulation around the part where the connection wires and the coil conductors 22a are located, and thus the size of the stator 20 can be reduced. In addition, since the connection wires and the coil conductors 22a are made of the same material, thermal resistance that can arise at the connection part therebetween is reduced, whereby heat generation due to currents flowing through the connection wires and the coil conductors 22a can be suppressed.

The two connection wires 24UA, 24UB may be formed from rectangular wires. In this case, the temperature sensor can contact with surface parts of the connection wires 24UA, 24UB, whereby the areas of the connection wires 24UA, 24UB contacting with the temperature sensor 25 increase. Thus, the temperature sensor 25 can be retained more stably by the connection wires 24UA, 24UB and accuracy of temperature detection for the stator coil 22 can be further improved. In addition, the surfaces in the long-side direction in the cross-section of the parts of the rectangular wires holding the temperature sensor 25 therebetween may be located in parallel to the axial direction, and the temperature sensor 25 may be retained by the surfaces in the short-side direction in the cross-section of the rectangular wires. In this case, the size in the radial direction of the part where the temperature sensor 25 is located can be reduced, whereby the size of the stator 20 can be reduced.

Each of the plurality of coil conductors 22a may form a coil for any phase among the coils for a plurality of phases, and at least two of the connection wires 24UA, 24UB may form a coil for the same phase. In this case, the temperature of the stator coil for a specific phase can be measured independently. In addition, the stator 20 may include a plurality of the temperature sensors, and the plurality of temperature sensors may respectively detect the temperatures of the coils for different phases. In this case, even if unbalanced currents occur in the stator coil 22 due to disconnection or the like and heat is abnormally generated only in one phase, the abnormality occurring only in one phase can be detected.

The rotary electric machine 100 according to the first embodiment includes: the rotor 10 which has the rotor core 11 and rotates integrally with the rotary shaft 12; and the stator 20 according to the present disclosure, located on the outer side in the radial direction of the rotor core 11. Therefore, size increase in the radial direction of the stator 20 is suppressed, whereby the rotary electric machine 100 having a reduced size can be obtained.

Second Embodiment

Figure 8:
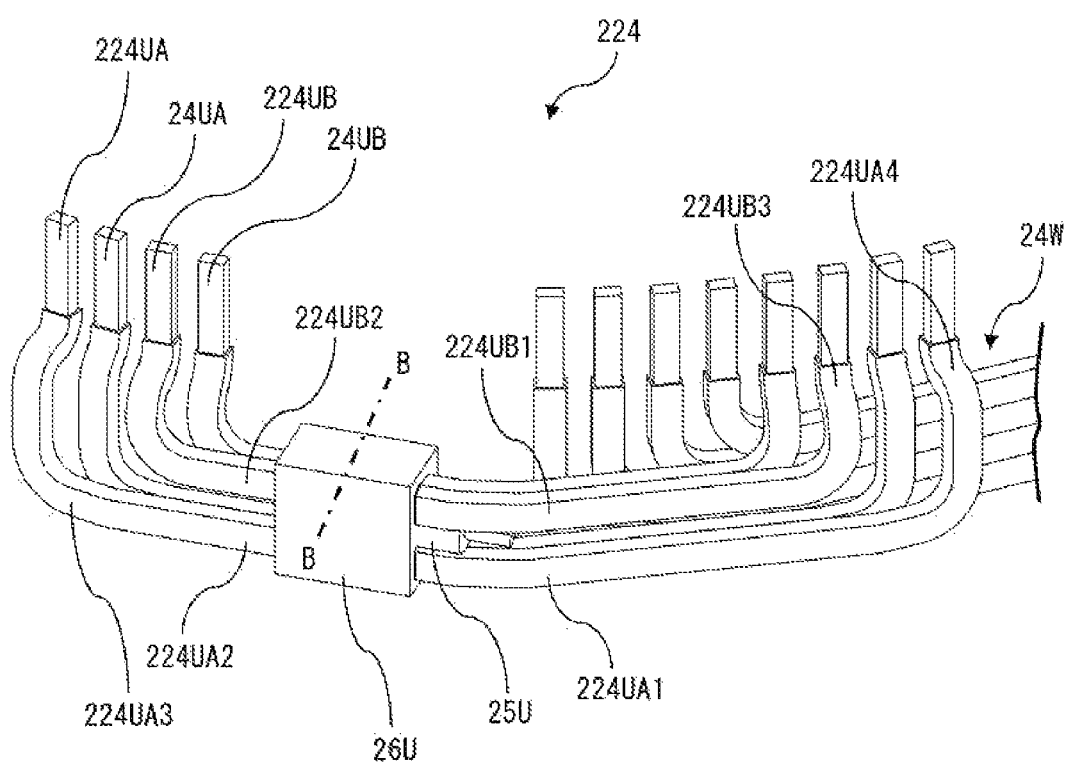
FIG. 8 is a perspective view of a connection wire unit of a rotary electric machine according to the second embodiment of the present disclosure.
Figure 9:
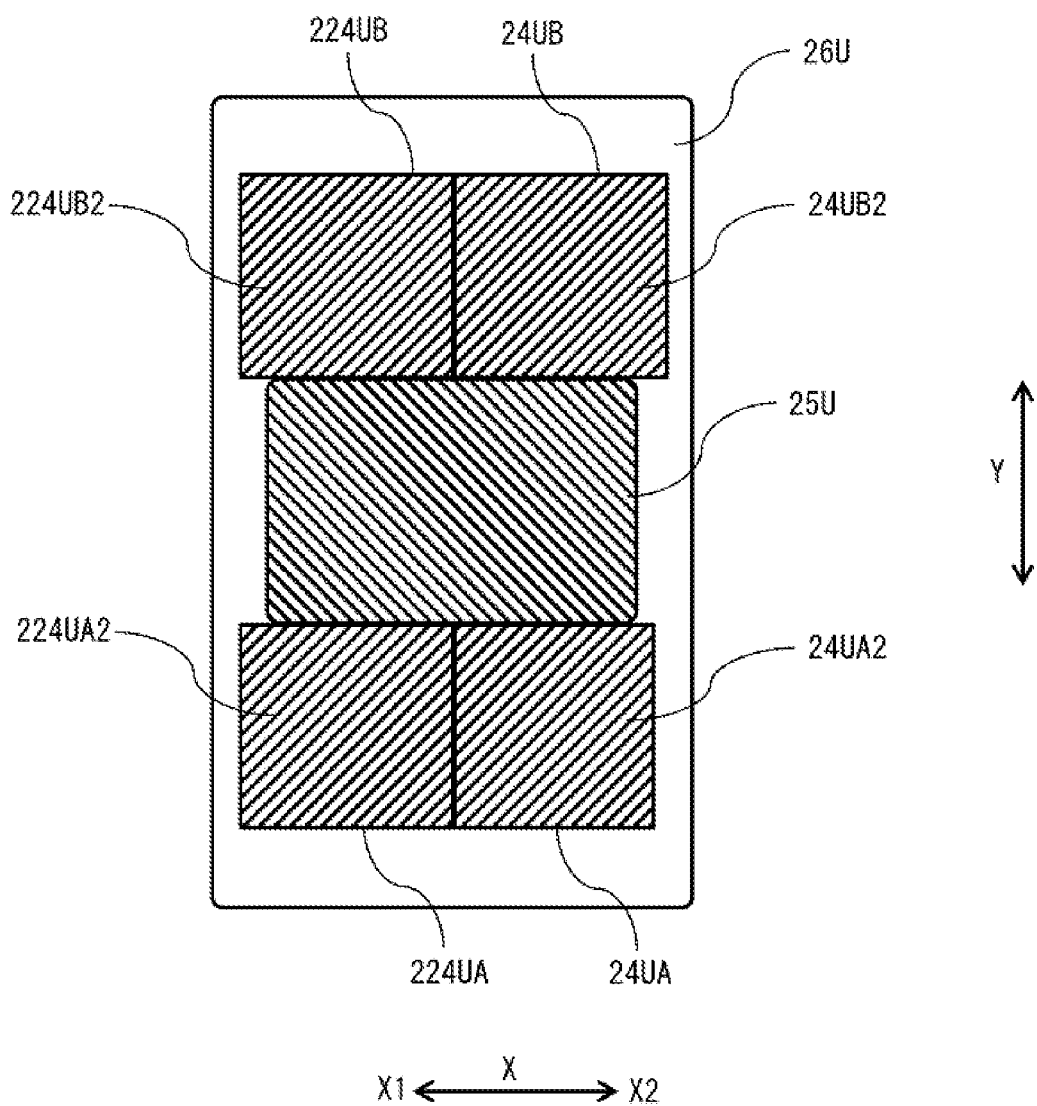
FIG. 9 is a sectional view of the connection wire unit taken at a B-B cross-section position in FIG. 8.

A stator 20 according to the second embodiment will be described. FIG. 8 is a perspective view of a connection wire unit 224 of the stator 20 of the rotary electric machine 100 according to the second embodiment, and illustrates the connection wire unit of the coil for U phase. FIG. 9 is a sectional view of the connection wire unit 224 taken at a B-B cross-section position in FIG. 8. The stator 20 of the rotary electric machine 100 according to the second embodiment is configured such that a plurality of connection wires are located on both sides in the axial direction of the temperature sensor 25U.

A first connection wire group composed of at least two of the connection wires and a second connection wire group composed of at least two of the connection wires have parts arranged with an interval therebetween in the axial direction, and the temperature sensor is located in the interval and held between the first connection wire group and the second connection wire group. In the present embodiment, the first connection wire group includes two connection wires 24UA, 224UA, and the second connection wire group includes two connection wires 24UB, 224UB. The temperature sensor 25U is held between the connection wires 24UA, 224UA and the connection wires 24UB, 224UB. In the first embodiment, over the entire circumference of the slots, three phases are sequentially arranged while two slots for the same phase are adjacent to each other. In the present embodiment, over the entire circumference of the slots, three phases are sequentially arranged while four slots for the same phase are adjacent to each other. Therefore, the coil for U phase is provided with four connection wires 24UA, 224UA, 24UB, 224UB.

With this structure, a plurality of connection wires are located on each of both sides in the axial direction of the temperature sensor 25U, and the temperature sensor 25U is held between the plurality of connection wires. Therefore, heat of the coil conductors 22a and the plurality of connection wires forming the stator coil 22 is transferred from both sides of the temperature sensor 25U, and thus accuracy of temperature detection for the stator coil 22 can be improved.

The connection wire 224UA has straight portions 224UA1, 224UA2, 224UA3 and offset portions 224UA4. The connection wire 224UB has straight portions 224UB1, 224UB2 and offset portions 224UB3. As shown in FIG. 8, the offset portions 224UA4, 224UB3 are bent toward the inner side in the radial direction so as to offset two connection wires which are the coated conductors. Thus, the offset portions 224UA4, 224UB3 can be connected to the terminal peeled portions provided on the inner side in the radial direction while avoiding contact with the connection wires forming the coil for W phase.

As shown in FIG. 9, in the present embodiment, the two connection wires 24UA, 224UA of the first connection wire group are arranged in the radial direction and contact with each other, and the two connection wires 24UB, 224UB of the second connection wire group are arranged in the radial direction and contact with each other. Parts of the two connection wires 24UA, 224UA contacting with each other are the straight portions 24UA2, 224UA2, and parts of the two connection wires 24UB, 224UB contacting with each other are the straight portions 24UB2, 224UB2. With this structure, since the areas of the connection wires 24UA, 224UA, 24UB, 224UB contacting with the temperature sensor 25U increase, the temperature sensor 25U is retained more stably by the connection wires 24UA, 224UA, 24UB, 224UB and accuracy of temperature detection for the stator coil 22 can be further improved.

In the present embodiment, the connection wires 24UA, 224UA contact with each other such that the surfaces of the connection wires 24UA, 224UA on the temperature sensor 25U side are perpendicular to the axial direction. In addition, the connection wires 24UB, 224UB contact with each other such that the surfaces of the connection wires 24UB, 224UB on the temperature sensor 25U side are perpendicular to the axial direction. With this structure, the temperature sensor 25U is retained more stably by the connection wires 24UA, 224UA, 24UB, 224UB and accuracy of temperature detection for the stator coil 22 can be further improved.

Modifications

Figure 10:
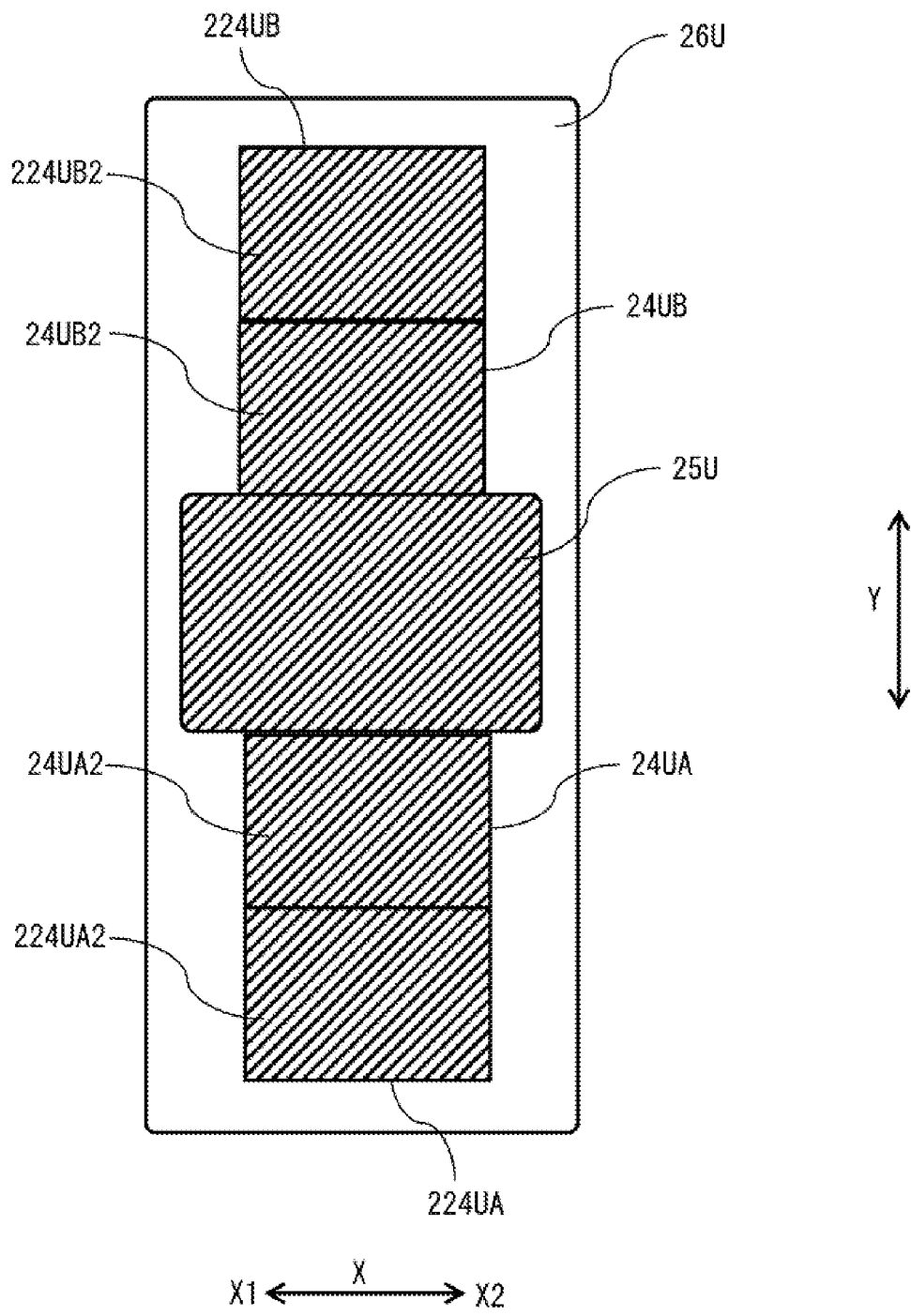
FIG. 10 is a sectional view of a connection wire unit of another rotary electric machine according to the second embodiment.

Modifications of the stator 20 according to the second embodiment will be described. FIG. 10 is a sectional view of the connection wire unit 224 of the stator 20 of another rotary electric machine 100 according to the second embodiment, taken at a position equivalent to that in FIG. 9. The two connection wires 24UA, 224UA of the first connection wire group are arranged in the axial direction and contact with each other, and the two connection wires 24UB, 224UB of the second connection wire group are arranged in the axial direction and contact with each other. The temperature sensor 25U is held between one connection wire 24UA on the interval side of the first connection wire group and one connection wire 24UB on the interval side of the second connection wire group. Parts of the two connection wires 24UA, 224UA arranged in the axial direction are the straight portions 24UA2, 224UA2, and parts of the two connection wires 24UB, 224UB arranged in the axial direction are straight portions 24UB2, 224UB2. With this structure, the size in the radial direction of the part where the temperature sensor 25 is located can be reduced, whereby the size of the stator 20 can be reduced.

Figure 11:
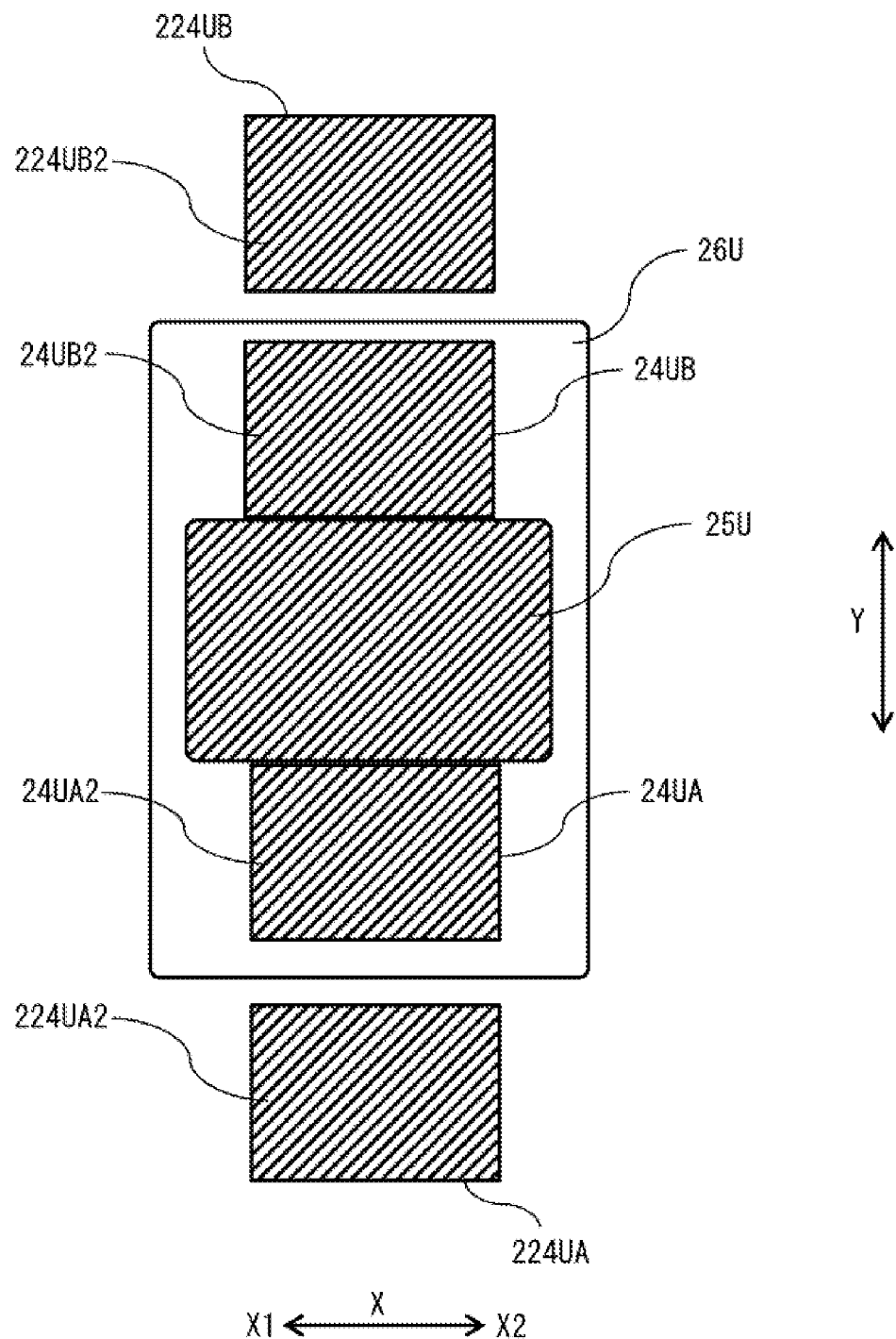
FIG. 11 is a sectional view of a connection wire unit of still another rotary electric machine according to the second embodiment.

The structure of the resin member 26U surrounding the temperature sensor 25U and the straight portions 24UA2, 224UA2, 24UB2, 224UB2 is not limited to the structure in FIG. 10. As shown in FIG. 11, the resin member 26U may be formed so as to surround the temperature sensor 25U and the straight portions 24UA2, 24UB2. FIG. 11 is a sectional view of the connection wire unit 224 of the stator 20 of still another rotary electric machine 100 according to the second embodiment, taken at a position equivalent to that in FIG. 9. With this structure, the resin member 26U part can be reduced, whereby the size of a mold for molding can be reduced.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

Hereinafter, modes of the present disclosure are summarized as additional notes.

(Additional Note 1)

A stator comprising:
a cylindrical stator core;
a plurality of coil conductors each having a coil body located in a slot of the stator core and a conductor end protruding from the stator core;
a plurality of connection wires extending in a circumferential direction of the stator core and connecting the conductor ends separated from each other in the circumferential direction; and
a temperature sensor, wherein
at least two of the connection wires have parts arranged with an interval therebetween in an axial direction of the stator core, and
the temperature sensor is located in the interval and held between the connection wires on both sides in the axial direction.

(Additional Note 2)

The stator according to additional note 1, wherein
the plurality of conductor ends protrude from the stator core at respective positions in the circumferential direction and respective positions in a radial direction of the stator core,
the plurality of connection wires are located so as to be arranged in the circumferential direction and the radial direction,
at least two of the connection wires are connected to the conductor ends located on an outermost side in the radial direction, and
at least two of the connection wires are located on an outer side in the radial direction among the plurality of connection wires and are located on an inner side in the radial direction from an outer circumference of the stator core as seen in the axial direction.

(Additional Note 3)

The stator according to additional note 1 or 2, wherein
at least two of the connection wires have straight portions extending in a constant direction between the connected conductor ends, and
the straight portions hold the temperature sensor therebetween.

(Additional Note 4)

The stator according to additional note 3, wherein
the straight portions of at least two of the connection wires are located in parallel to each other.

(Additional Note 5)

The stator according to additional note 3 or 4, wherein
the temperature sensor and parts of the straight portions holding the temperature sensor therebetween are surrounded by a resin member.

(Additional Note 6)

The stator according to any one of additional notes 1 to 5, wherein
the connection wires and the coil conductors are formed by insulation-coated conductors made of the same material.

(Additional Note 7)

The stator according to any one of additional notes 1 to 6, wherein
at least two of the connection wires are formed from rectangular wires.

(Additional Note 8)

The stator according to additional note 7, wherein
surfaces in a long-side direction in a cross-section of parts of the rectangular wires holding the temperature sensor therebetween are located in parallel to the axial direction, and
the temperature sensor is retained by surfaces in a short-side direction in the cross-section of the rectangular wires.

(Additional Note 9)

The stator according to additional note 2, wherein
a first connection wire group composed of at least two of the connection wires and a second connection wire group composed of at least two of the connection wires have parts arranged with the interval therebetween in the axial direction, and
the temperature sensor is located in the interval and held between the first connection wire group and the second connection wire group.

(Additional Note 10)

The stator according to additional note 9, wherein at least two of the connection wires of the first connection wire group are arranged in the axial direction and contact with each other,
at least two of the connection wires of the second connection wire group are arranged in the axial direction and contact with each other, and
the temperature sensor is held between one of the connection wires on the interval side of the first connection wire group and one of the connection wires on the interval side of the second connection wire group.

(Additional Note 11)

The stator according to additional note 9, wherein
at least two of the connection wires of the first connection wire group are arranged in the radial direction and contact with each other,
at least two of the connection wires of the second connection wire group are arranged in the radial direction and contact with each other, and
the temperature sensor is held between at least two of the connection wires of the first connection wire group and at least two of the connection wires of the second connection wire group.

(Additional Note 12)

The stator according to any one of additional notes 1 to 11, wherein
each of the plurality of coil conductors forms a coil for any phase among coils for a plurality of phases, and
at least two of the connection wires form a coil for the same phase.

(Additional Note 13)

The stator according to additional note 12, comprising a plurality of the temperature sensors, wherein
the plurality of temperature sensors respectively detect temperatures of coils for different phases.

(Additional Note 14)

A rotary electric machine comprising:
a rotor which has a rotor core and rotates integrally with a rotary shaft; and
the stator according to any one of additional notes 1 to 13, located on an outer side in a radial direction of the rotor core.

DESCRIPTION OF THE REFERENCE CHARACTERS 1 housing
2 bracket
3 bearing
10 rotor
11 rotor core
12 rotary shaft
13 permanent magnet
20 stator
21 stator core
22 stator coil
22e1 non-wire-connection side coil end portion
22e2 wire-connection side coil end portion
23, 23U1Ain, 23U1Bin, 23U1Aout, 23U1Bout, 23U2A, 23U2B, 23U3A, 23U3B, 23U4Aout, 23U4Bout, 23U4Ain, 23U4Bin terminal peeled portion
24, 224 connection wire unit
24U, 24UA, 24UB, 24V, 24VA, 24VB, 24W, 24WA, 24WB, 224UA, 224UB connection wire
24UA1, 24UA2, 24UA3, 24UB1, 24UB2, 224UA1, 224UB1 straight portion
24UA4, 24UB3, 224UA4, 224UB3 offset portion
25, 25U, 25V temperature sensor
25a lead wire
26, 26U, 26V resin member
100 rotary electric machine

What is claimed is:

1. A stator comprising:
a cylindrical stator core;
a plurality of coil conductors each having a coil body located in a slot of the stator core and a conductor end protruding from the stator core;
a plurality of connection wires extending in a circumferential direction of the stator core and connecting the conductor ends separated from each other in the circumferential direction; and
a temperature sensor, wherein
at least two of the connection wires have parts arranged with an interval therebetween in an axial direction of the stator core, and
the temperature sensor is located in the interval and held between the connection wires on both sides in the axial direction, wherein
at least two of the connection wires are formed from rectangular wires,
surfaces in a long-side direction in a cross-section of parts of the rectangular wires holding the temperature sensor therebetween are located in parallel to the axial direction, and
the temperature sensor is retained by surfaces in a short-side direction in the cross-section of the rectangular wires.

2. A stator comprising:
a cylindrical stator core;
a plurality of coil conductors each having a coil body located in a slot of the stator core and a conductor end protruding from the stator core;
a plurality of connection wires extending in a circumferential direction of the stator core and connecting the conductor ends separated from each other in the circumferential direction; and
a temperature sensor, wherein
at least two of the connection wires have parts arranged with an interval therebetween in an axial direction of the stator core, and
the temperature sensor is located in the interval and held between the connection wires on both sides in the axial direction, wherein
the plurality of conductor ends protrude from the stator core at respective positions in the circumferential direction and respective positions in a radial direction of the stator core,
the plurality of connection wires are located so as to be arranged in the circumferential direction and the radial direction,
at least two of the connection wires are connected to the conductor ends located on an outermost side in the radial direction, at least two of the connection wires are located on an outer side in the radial direction among the plurality of connection wires and are located on an inner side in the radial direction from an outer circumference of the stator core as seen in the axial direction, a first connection wire group composed of at least two of the connection wires and a second connection wire group composed of at least two of the connection wires have parts arranged with the interval therebetween in the axial direction, the temperature sensor is located in the interval and held between the first connection wire group and the second connection wire group, at least two of the connection wires of the first connection wire group are arranged in the axial direction and contact with each other, at least two of the connection wires of the second connection wire group are arranged in the axial direction and contact with each other, and the temperature sensor is held between one of the connection wires on the interval side of the first connection wire group and one of the connection wires on the interval side of the second connection wire group.

3. A stator comprising:

a cylindrical stator core;

a plurality of coil conductors each having a coil body located in a slot of the stator core and a conductor end protruding from the stator core;

a plurality of connection wires extending in a circumferential direction of the stator core and connecting the conductor ends separated from each other in the circumferential direction; and a temperature sensor, wherein at least two of the connection wires have parts arranged with an interval therebetween in an axial direction of the stator core, and the temperature sensor is located in the interval and held between the connection wires on both sides in the axial direction by contacting an insulated portion of the connection wires, wherein the plurality of conductor ends protrude from the stator core at respective positions in the circumferential direction and respective positions in a radial direction of the stator core, the plurality of connection wires are located so as to be arranged in the circumferential direction and the radial direction, at least two of the connection wires are connected to the conductor ends located on an outermost side in the radial direction, at least two of the connection wires are located on an outer side in the radial direction among the plurality of connection wires and are located on an inner side in the radial direction from an outer circumference of the stator core as seen in the axial direction, a first connection wire group composed of at least two of the connection wires and a second connection wire group composed of at least two of the connection wires have parts arranged with the interval therebetween in the axial direction, the temperature sensor is located in the interval and held between the first connection wire group and the second connection wire group, at least two of the connection wires of the first connection wire group are arranged in the radial direction and contact with each other, at least two of the connection wires of the second connection wire group are arranged in the radial direction and contact with each other, and the temperature sensor is held between at least two of the connection wires of the first connection wire group and at least two of the connection wires of the second connection wire group.

\* \* \* \* \*